US007014204B2

(12) United States Patent

Meyers et al.

(10) Patent No.: US 7,014,204 B2
(45) Date of Patent: Mar. 21, 2006

(54) ROCKING WHEELCHAIR

(75) Inventors: Danny Meyers, Roxboro (CA); Philip Delbuey, Kirkland (CA); Ken Levesque, Montreal (CA); Cris Boar, Montreal (CA); Wei Xiao, Montreal (CA)

(73) Assignee: AMG Medical Inc., Montreal (CA)

( * ) Notice: Subject to any disclaimer, the term of this patent is extended or adjusted under 35 U.S.C. 154(b) by 23 days.

(21) Appl. No.: 10/678,119

(22) Filed: Oct. 6, 2003

(65) Prior Publication Data

US 2005/0073129 A1 Apr. 7, 2005

(51) Int. Cl.
*B62B 7/00* (2006.01)

(52) U.S. Cl. .............................. 280/304.1; 280/250.1; 280/47.41

(58) Field of Classification Search ............ 280/47.41, 280/288.4, 226.1, 220, 210, 200, 250.1, 304.1, 280/304; 297/DIG. 4, DIG. 7, 258.1, 270.1, 297/270.4, 271.1, 310
See application file for complete search history.

(56) References Cited

U.S. PATENT DOCUMENTS

| | | | | |
|---|---|---|---|---|
| 3,167,350 A | * | 1/1965 | Kiel | 297/267.1 |
| 3,415,531 A | * | 12/1968 | Kiel | 280/30 |
| 3,455,600 A | * | 7/1969 | Secor et al. | 297/45 |
| 3,976,152 A | * | 8/1976 | Bell | 180/9 |
| 4,125,269 A | * | 11/1978 | Kiel | 280/30 |
| 4,319,381 A | | 3/1982 | Rodaway | 16/44 |
| 4,324,414 A | | 4/1982 | Wilkes | 280/250.1 |
| 4,351,540 A | * | 9/1982 | Minnebraker | 280/250.1 |
| 4,544,200 A | | 10/1985 | Dunn et al. | 297/265.1 |
| 4,641,848 A | | 2/1987 | Ayers | |
| 4,707,026 A | | 11/1987 | Johansson | 297/281 |
| 4,893,827 A | * | 1/1990 | Gay et al. | 280/250.1 |
| 5,004,259 A | | 4/1991 | Ayers et al. | 280/304.1 |
| 5,110,183 A | | 5/1992 | Jeanes, III | 297/343 |
| 5,294,141 A | * | 3/1994 | Mentessi et al. | 280/250.1 |
| 5,499,833 A | | 3/1996 | Her et al. | 280/247 |
| 5,803,885 A | | 9/1998 | Tiller | 482/146 |
| 6,206,393 B1 | * | 3/2001 | Mascari et al. | 280/220 |
| 6,257,609 B1 | * | 7/2001 | O'Neill, Sr. | 280/304.1 |
| 6,547,206 B1 | * | 4/2003 | Dickie | 248/575 |
| 2004/0188979 A1 | * | 9/2004 | Bernatsky et al. | 280/304.1 |

FOREIGN PATENT DOCUMENTS

| | | |
|---|---|---|
| CA | 2307143 | 10/2001 |

* cited by examiner

*Primary Examiner*—Lesley D. Morris
*Assistant Examiner*—Daniel Yeagley
(74) *Attorney, Agent, or Firm*—Ogilvy Renault LLP

(57) ABSTRACT

A rocking wheelchair is provided with multiple adjustable features to meet various needs of different users with respect to safety, comfortableness and user/caregiver convenience. The rocking wheelchair includes an adjustable maximum rocking motion setting for users to select a preferable maximum rocking motion within a predetermined safety range. Rock/tilt locking mechanisms enable the seat assembly to be locked in either a normally unoccupied position or one of a plurality of tilt positions. The footrests can be selectively attached to either the frame for supporting the user's feet in a stationary position, or to the seat assembly to rock together therewith. The wheelchair can also be adjusted in height and is formed with a relatively simple configuration which is convenient for manufacturing.

23 Claims, 9 Drawing Sheets

ROCKING WHEELCHAIR

FIELD OF THE INVENTION

The present invention relates to wheelchairs employed to provide transportation for invalids or the aged, and more particularly relates to such wheelchairs which permit users to rock while seated therein.

BACKGROUND OF THE INVENTION

Wheelchairs for invalids such as handicapped or aged people are commonly constructed of a frame supported by a large pair of main wheels and a smaller pair of steering caster wheels normally located forwardly of the main drive wheels. A stationary positioned seat and back assembly is affixed to the frame so that a user is provided support while being transported about in the chair. However, such chairs are relatively uncomfortable for prolonged usage, especially for the aged.

It is known that a rocking motion can render therapeutic and/or relaxing benefits for invalids and aged persons who are commonly confined to a wheelchair for their transportation because they are not ambulatory. Therefore wheelchairs have been developed to provide users with the benefits of a rocking motion. One example of such rocking wheelchairs is described in U.S. Pat. No. 4,641,848, issued to Robert Ayers on Feb. 10, 1987 which discloses a form of rocking wheelchair developed to provide a comfortable alternative to existing wheelchairs. Ayers' wheelchair is somewhat similar in design to existing wheelchairs, but has a rockable seat attached to its frame by pivot connections at each side. Springs are attached to the seat and the frame to serve as a bias means to maintain the seat in a generally horizontal alignment when the chair is unoccupied.

Although the Ayers wheelchair provides a comfortable rocking seat, its manufacture requires a great deal of precision which is a disadvantage for production of the chair in large volumes. U.S. Pat. No. 5,004,259, issued to Ayers et al. on Apr. 2, 1991 discloses an improved rocking wheelchair formed of a frame, two sets of support wheels for the frame, and a seat portion rockably connected to the frame by a rocking assembly. The rocking assembly includes a pair of leaf springs extending horizontally and connected by respective upper and lower strip means to the seat portion and the frame in order to maintain the seat in a generally horizontal alignment when the chair is unoccupied, and permit the seat to rock with respect to the frame. Rx-Rocker Corporation which is the assignee of U.S. Pat. No. 5,004,259 has further improved on the Ayers et al.'s rocking wheelchair with vertically positioned leaf springs and frictional locking means to lock the seat in a tilt position.

Nevertheless, as the demand for wheelchairs increases, concerns arise regarding aspects of, for example safety, adjustability and user/caregiver convenience. Therefore, there is a need for further improved rocking wheelchairs.

SUMMARY OF THE INVENTION

One object of the present invention is to provide a rocking wheelchair to meet different users' needs.

In accordance with one aspect of the present invention, there is provided a wheelchair that permits a user to rock while seated therein. The wheelchair comprises a frame structure and a plurality of wheels rotatably mounted to the frame structure. The wheelchair includes a seat assembly and a rocking assembly disposed between the seat assembly and the frame. The seat assembly has a seat member and a back support member. The rocking assembly includes bias means for normally maintaining the seat member in a desired alignment when the wheelchair is unoccupied and permitting the seat assembly to yieldably rock back and forth about a substantially horizontal axis with respect to the frame. The wheelchair is further provided with a rocking motion controlling system including a first rocking motion setting device for adjustably setting a selected maximum rocking motion according to a user's preference.

The rocking motion controlling system preferably comprises a second rocking motion setting device for ensuring that the selected maximum rocking motion is not greater than a predetermined level.

It is preferable that the rocking motion controlling system of the wheelchair further comprises rock/tilt locking mechanisms for selectively locking the seat assembly at the normal unoccupied position or a selected one of a plurality of predetermined tilt positions. The rock/tilt locking mechanisms are preferably incorporated with the first rocking motion setting device.

In accordance with another aspect of the present invention, there is provided a wheelchair that permits a user to rock while seated therein. The wheelchair comprises a frame structure, and a plurality of wheels rotatably mounted to the frame structure. The wheelchair includes a seat assembly and a rocking assembly disposed between the seat assembly and the frame. The seat assembly has a seat member and a back support member. The rocking assembly includes bias means to normally maintain the seat member in a desired alignment when the wheelchair is unoccupied and to permit the seat assembly to yieldably rock back and forth about a substantially horizontal axis with respect to the frame. The wheelchair is provided with a rocking motion controlling system including rock/tilt locking mechanisms for selectively locking the seat assembly in the normally unoccupied position or in a selected one of a plurality of predetermined tilt positions. The rock/tilt locking mechanisms include a pair of locking elements operatively mounted to the respective seat assembly and the frame structure. One of the locking elements is adapted to be receivable in a selected one of a plurality of spaces defined in the other of the locking elements.

The locking elements are preferably a spring which biases the locking elements into engagement. The locking elements are disengagable for example, by actuating a controller against the spring's force.

In accordance with further aspect of the present invention, there is provided a wheelchair that permits a user to rock while seated therein and is adjustable for users. The wheelchair comprises a frame formed of spaced-apart rigid side members connected to together by cross braces, and a pair of main wheels rotatably mounted to the frame and adapted to be driving wheels for the wheelchair. At least one caster wheel is connected to the frame and is pivotable about a substantially vertical axis. The wheelchair includes a seat assembly and a rocking assembly. The seat assembly includes a seat member, a back support member and side support members attached to the seat member at opposed sides thereof. The rocking assembly includes a bias means, preferably a pair of leaf springs in a spaced-apart relationship, normally defining a substantially vertical plane transverse to the seat assembly when the wheelchair is unoccupied. The leaf springs interconnect the side support members of the seat assembly and the side members of the frame to permit the seat assembly to yieldably rock back and forth about a substantially horizontal axis with respect to the frame. The frame includes means for selectively attaching the main wheels in one of a plurality of predetermined positions to adjust the height of the wheelchair.

The wheelchair preferably comprises means for adjusting a selected maximum rocking motion of the seat assembly within a predetermined range.

It is preferable that the at least one caster wheel is adjustable in height relative to the frame. It is also preferable that a foot resting device is selectively mounted to the wheelchair in a first position in which the foot resting device is adapted to rock together with the seat assembly, and a second position in which the foot resting device is stationary with respect to the seat assembly during a rocking motion. It is also preferable that the foot resting device includes a pair of footrests, each being adjustable in height relative to the seat assembly in the first selected position and relative to the frame in the second selected position. The wheelchair further preferably includes an adjustable anti-tip device attached to the frame thereof to prevent the wheelchair from falling backwards.

The rocking wheelchair according to the present invention advantageously provides a simple and lightweight configuration with multiple adjustable controlling features regarding safety, adjustability, comfortableness and user/caregiver convenience.

Other features and advantages of the present invention will be better understood with reference to the preferred embodiments described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENTS

Figure 1:
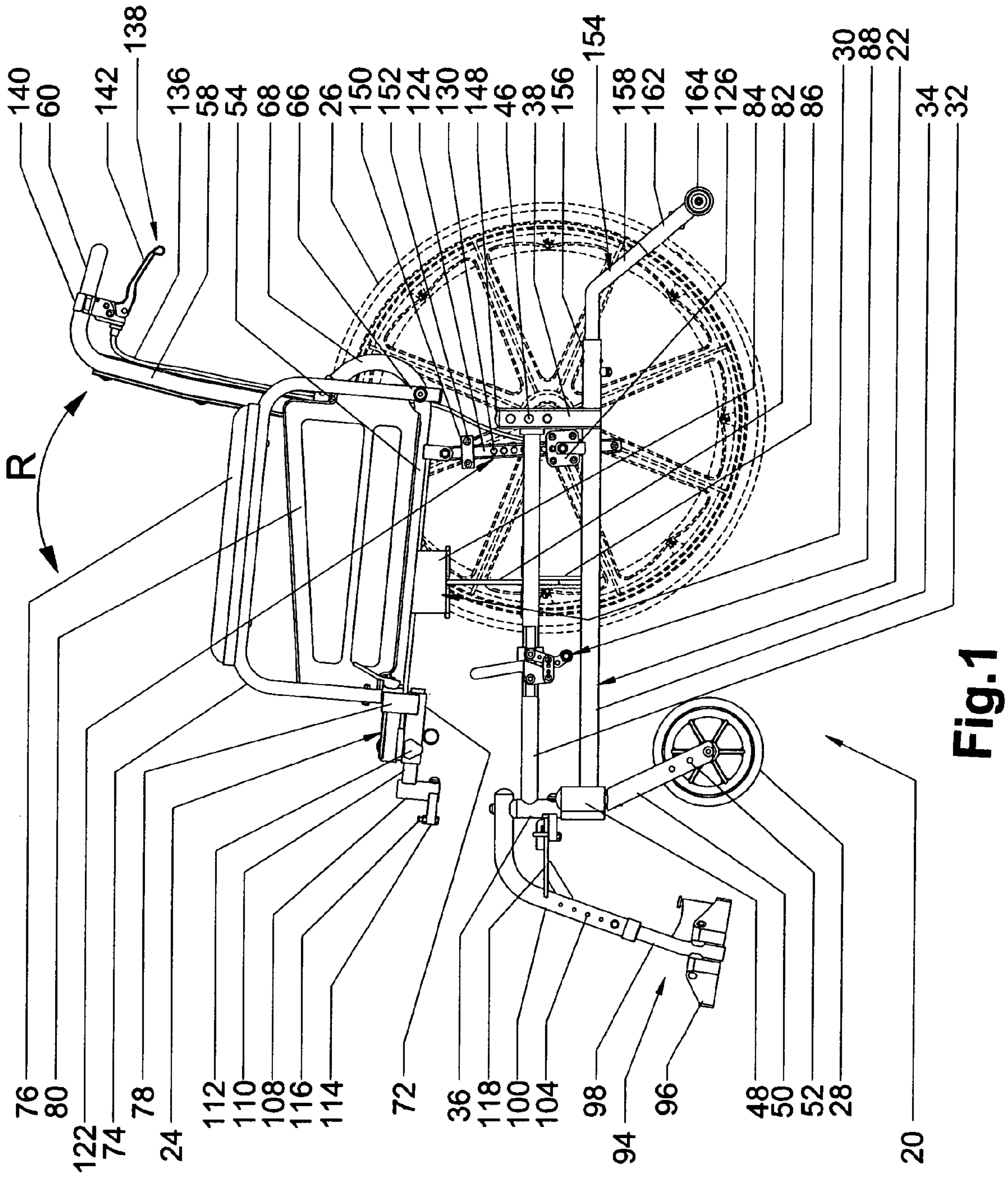
FIG. 1 is a side elevational view of a rocking wheelchair incorporating one embodiment of the present invention, showing the chair in a normal unoccupied position with footrests attached in an inactive position, and with the main wheels removed and the position thereof being shown in broken lines.

Referring now to the drawings and with particular reference to FIGS. 1–4, a preferred embodiment of an improved rocking wheelchair of the present invention is shown generally at numeral 20. The wheelchair 20 includes a frame assembly 22, a seat assembly 24, a pair of main wheels 26, a pair of caster wheels 28, and a rocking assembly 30. The frame assembly 22 is preferably constructed of high strength, light-weight tubular members to provide a chair that is durable and light enough so that it can be handled relatively easily.

The main wheels 26 are driving wheels and include driving rings 27 affixed thereto, respectively. The mian wheels 26 are conventional to the wheelchairs, and will not be described in detail.

In particular, the frame assembly 22 is formed of a pair of spaced-apart rigid upper side members 32 and a pair of spaced-apart lower side members 34. The upper and lower side members 32, 34 at each side are interconnected at their respective front ends by a sleeve 36 and at their respective rear ends by a support post 38. The sleeve 36 and the support post 38 will be further described in detail below.

The lower side members 34 are interconnected at their respective rear ends by a rear cross brace 40 and at their respective front portions by a front cross brace 42 so that the frame assembly substantially represents a rectangular configuration.

Figure 7:
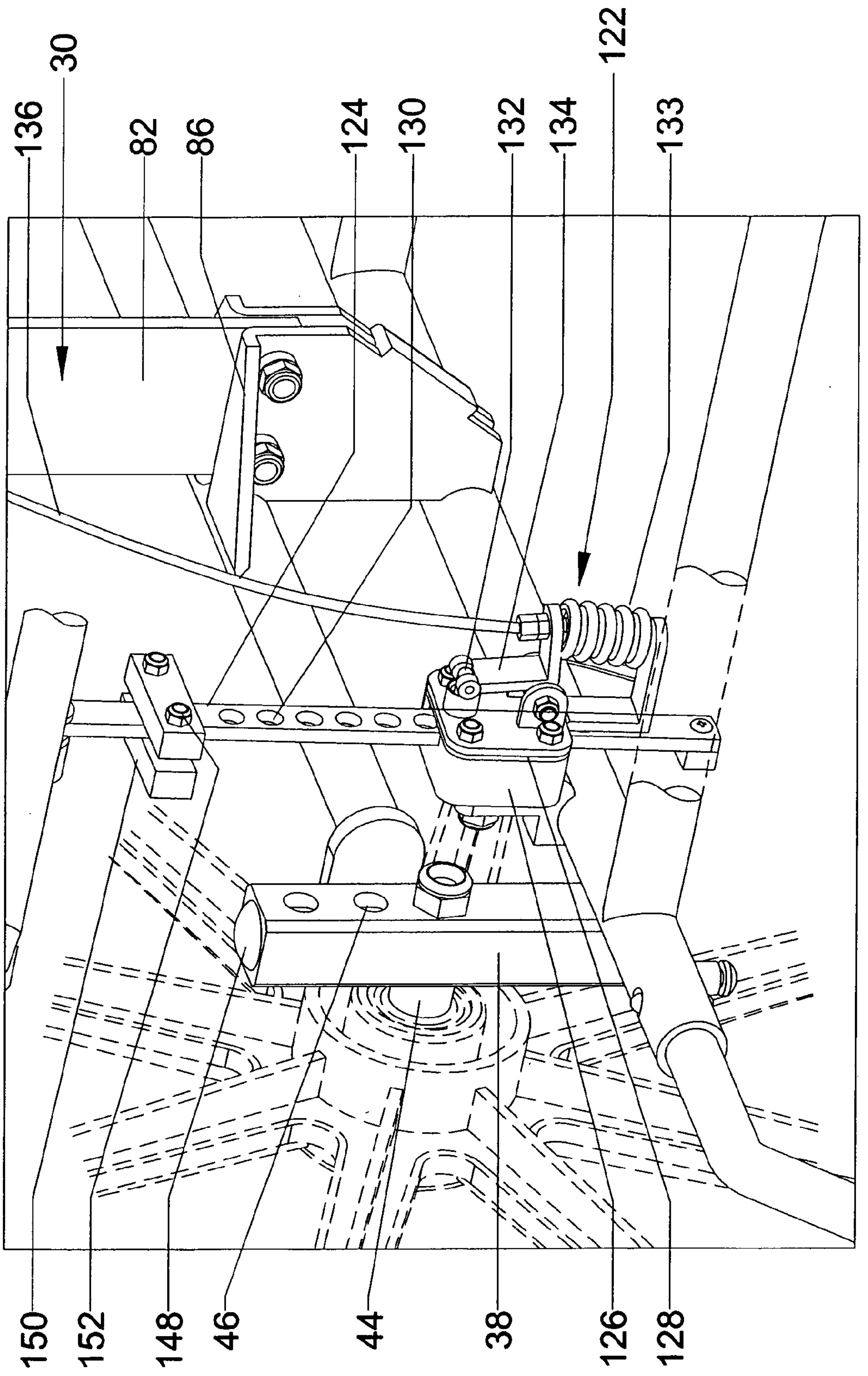
FIG. 7 is a perspective view in an enlarged scale of portion 7 of FIG. 4, showing the rock/tilt locking mechanisms and the first rocking motion setting device.

Each of the support posts 38 journals one of the main wheels 26 (more clearly shown in FIG. 7) via axle 44 which is selectively received in one of three openings 46 defined in each support post 38 in a spaced apart pattern such that the main wheels 26 are rotatably and selectively mounted to the frame assembly 22, thereby adjusting the entire wheelchair height according to the size of a user. A downwardly opening vertically aligned pivot socket 48 is positioned at the outside of and secured to the sleeve 36 at each side of the frame assembly 22 for mounting the caster wheels 28 forwardly of the main wheels 26. Each of the caster wheels 28 is rotatably attached to an inverted U-shaped yoke 50 which includes three pair of mounting holes 52 such that the caster wheels 28 can be selectively mounted to the yoke 50 in order to adjust the wheelchair height in accordance with the adjustment of the main wheels 26. The yoke 50 is rotatably received in the pivot socket 48 and the center of the caster wheel 28 is offset from a central line of the pivot socket 48, such that the castor wheels 28 provide a steering function during transportation of the wheelchair 20.

The seat assembly 24 extends transversely between the opposed side frame members 32, 34 and is formed from tubular side support members 54. A pliable seat member 56 formed of leather, fabric, or the like, is attached to and extends between the side support members 54. The seat assembly 24 further includes two rear posts 58 which are secured to and extend substantially upright from the respective side support members 54 at the respective rear ends thereof. An upper portion of each rear post 58 is bent rearwardly to form a grip section 60 to be held by a caregiver in order to manipulate the wheelchair 20. The grip sections 60 are preferably connected together by a cross brace 62 which is preferably formed together with the rear posts 58, by a single tubular member. A back support member 64 formed of a material similar to the seat member 56 is attached to and extends between the rear posts 58. A rear cross brace 66 is preferably made of a tubular member secured to the rear ends of the side support members 54 and extends therebetween. A pair of reinforcing braces 68 preferably made of tubular members, are attached to the lower portion of the respective rear posts 58. The seat assembly 24 further includes a front cross brace 70 which is preferably made of tubular members and is secured to and extends between two rectangular sleeves 72 which in turn are securely attached to the front portion of the respective side support members 54 of the seat assembly 24. Thus, the seat assembly 24 forms a strong and rigid configuration for supporting the user's weight.

The seat assembly 24 preferably further includes a pair of armrests 74 which are formed from two tubular members respectively, each being shaped in a substantially inverted U-shape. A pad member 76 is attached to each of the inverted U-shaped armrests 74 for supporting the user's arms. A plate 80, preferably made of plastic or sheet metal is attached to each of the reversed U-shaped armrests 74 and extends between the front and rear sections thereof. Each armrest 74 is pivotally mounted at its rear end to the rear cross brace 66 and is releasably secured to a locking device 78 which is attached to the respective side support members 54. Thus, both armrests 74 can be selectively pivoted rearwardly away from seat member 56 in order to allow the user to easily enter or leave the wheelchair 20. Various well known locking devices can be employed as the locking device 78 and will therefore not be further described.

The rocking assembly 30 generally includes a bias means which comprises a pair of leaf springs 82 for normally maintaining the seat assembly 24 in a desired alignment when the wheelchair 20 is unoccupied, and permitting the seat assembly 24 to yieldably rock back and forth about a substantially horizontal axis with respect to the frame, as shown by the arrow R. As more clearly shown in FIGS. 1, 3, 5 and 7, the pair of leaf springs 82 which are preferably made of E-glass fiber material in a thermoset resin formulation, are disposed in a spaced-apart relationship and define a substantially vertical plane transverse to the seat assembly 24. Each leaf spring is connected at one end thereof to one of the side support members 54 of the seat assembly 24 by an upper bracket 84, and at the other end thereof to one of the upper side members 32 of the frame assembly 22 by a lower bracket 86. The leaf springs 82 are sized to provide adequate strength and resiliency in order to support the seat assembly with the entire weight of the user seated therein in a normal seated position, and to rock back and forth about the substantially horizontal axis when the user shifts his or her center of gravity in a rhythmic manner. The upper and lower brackets 84, 86 are designed to have a reinforced configuration and are securely affixed to the respective seat assembly 24 and frame structures to ensure the secure interconnection of the rocking assembly 30 between the seat assembly 24 and the frame assembly 22. Each of the leaf springs 82 are preferably bolted to the respective upper and lower brackets 84, 86. Thus, the rocking assembly 30 provides a durable and yet generally simplistic construction that permits the seat assembly 24 to rock with respect to the frame assembly 22.

Although the rocking assembly 30 preferalby includes two leaf springs 82, it is possible to use only one leaf spring 82 if it is sufficiently wide, and of course more than two leaf springs 82 can be employed. Alternatively, the rocking assembly 30 may include other types of bias means with adequate mechanisms to achieve a similar function of the leaf springs 82.

Figure 2:
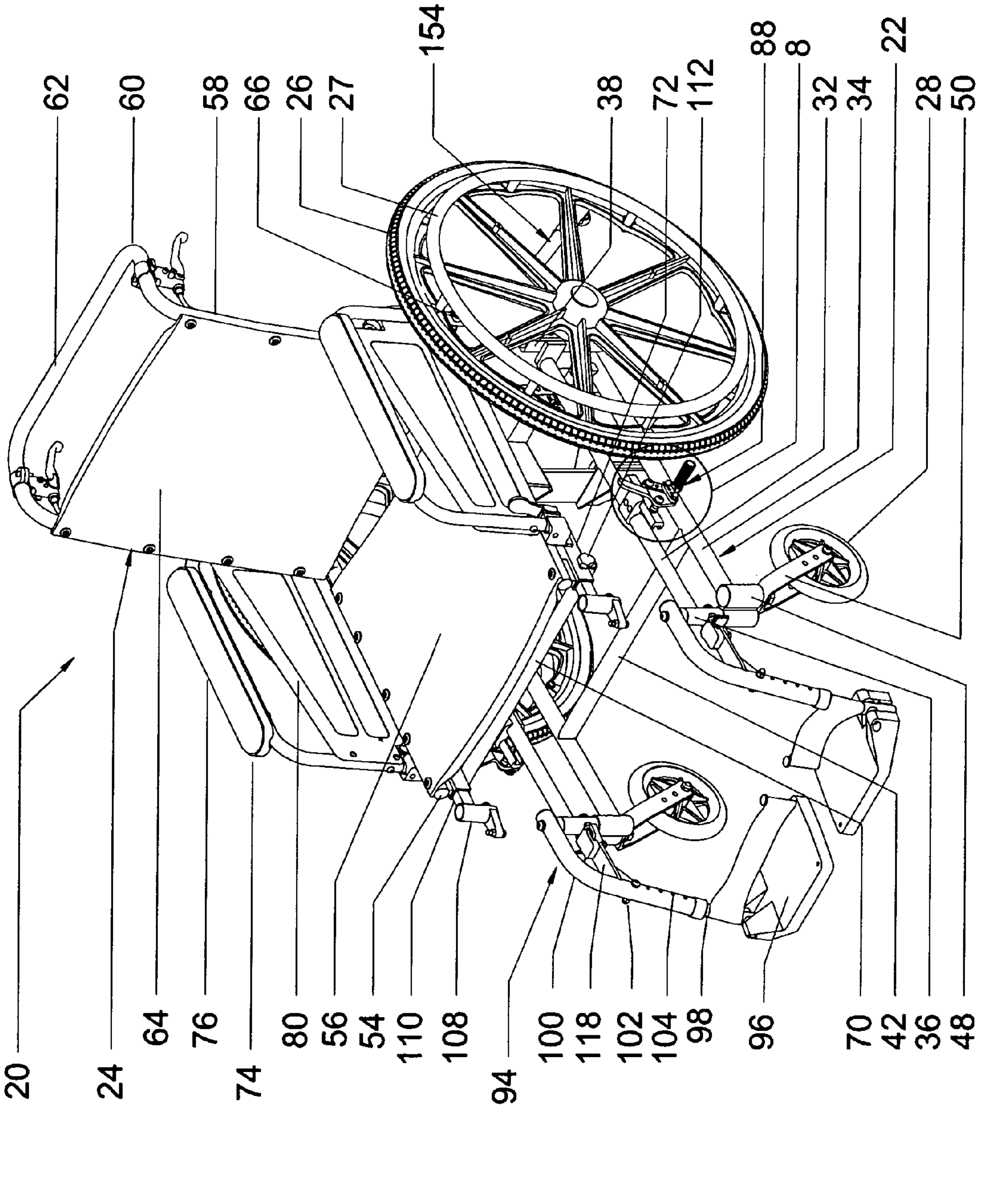
FIG. 2 is an upper and side perspective view of the embodiment of FIG. 1, showing the wheelchair locked in a tilt position with its footrests attached in an active position.
Figure 3:
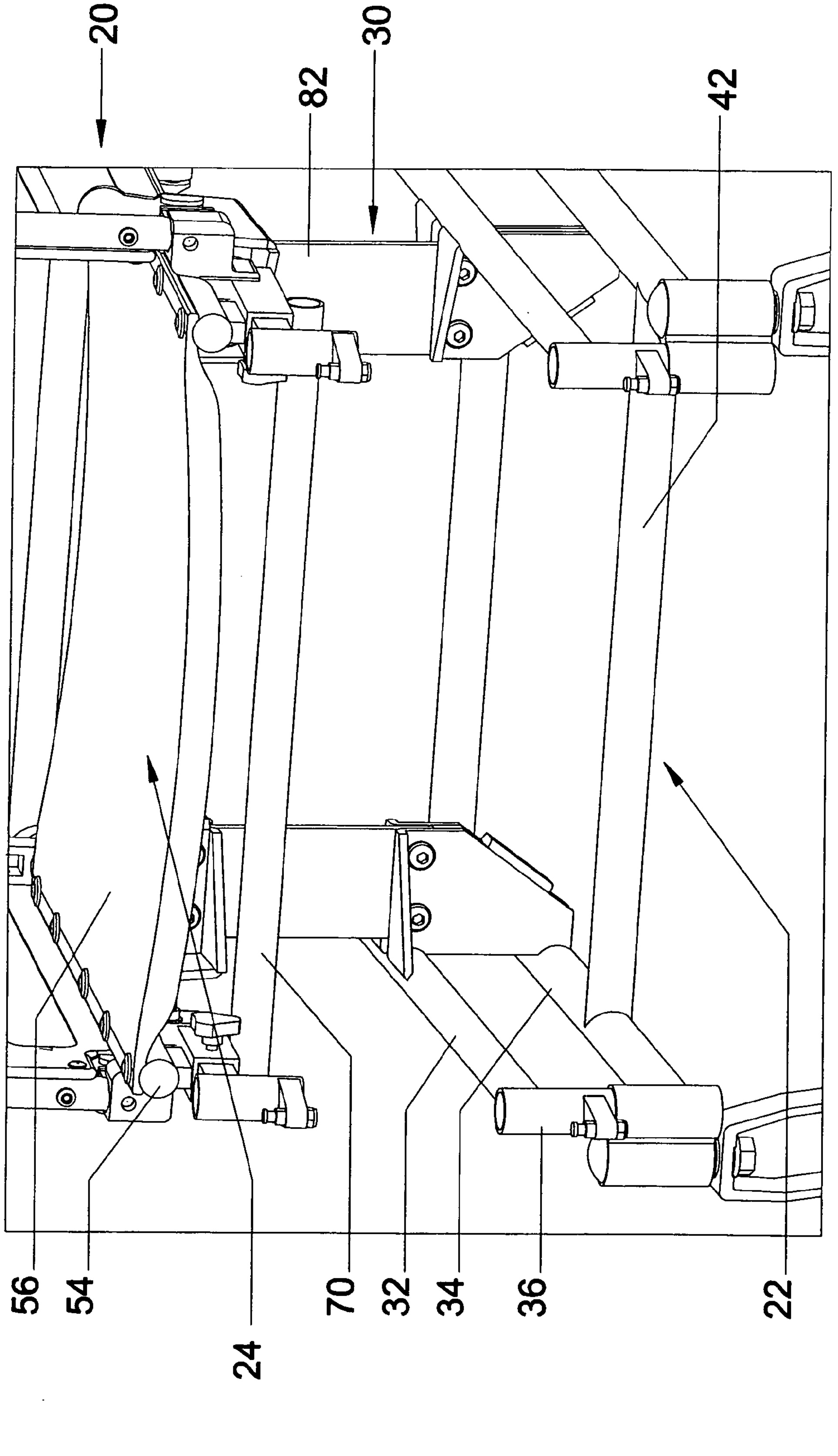
FIG. 3 is a partial front perspective view of the embodiment of FIG. 1, showing the front portion of the frame and the seat assembly thereof.
Figure 4:
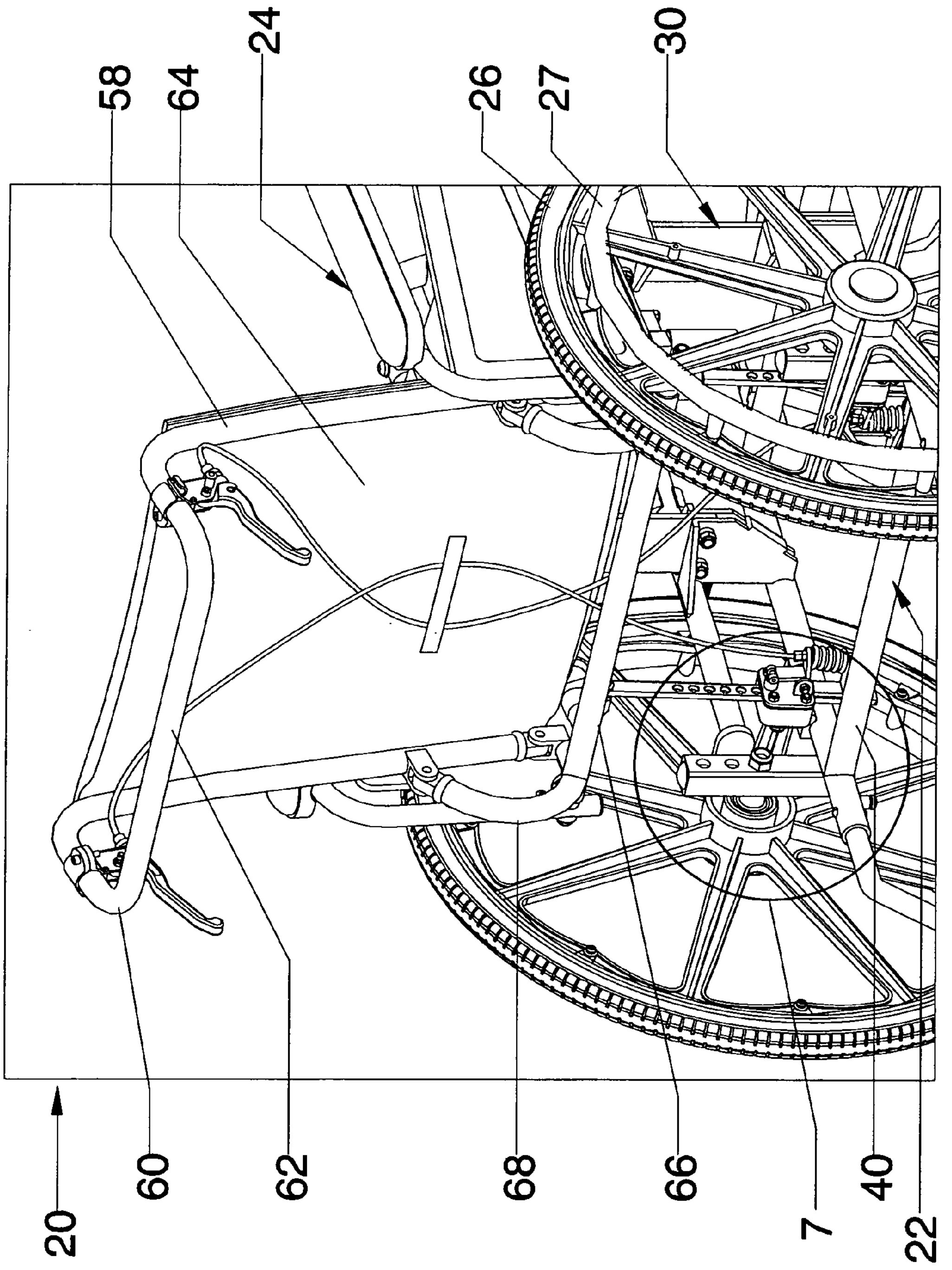
FIG. 4 is a partial rear and side perspective view of the embodiment of FIG. 1, showing the rear portion of the frame and the seat assembly thereof.
Figure 8:
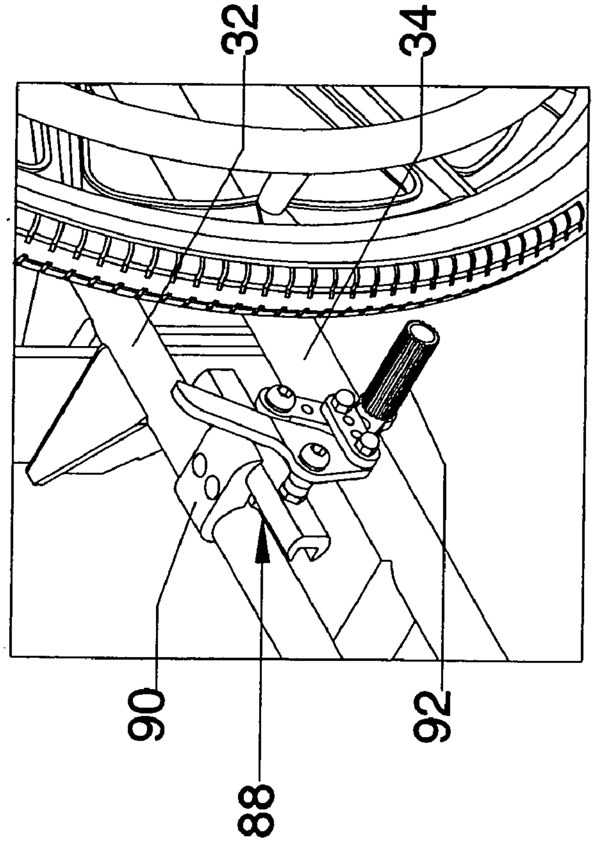
FIG. 8 is perspective view in an enlarged scale of portion 8 of FIG. 2, showing the adjustable brake.
Figure 10:
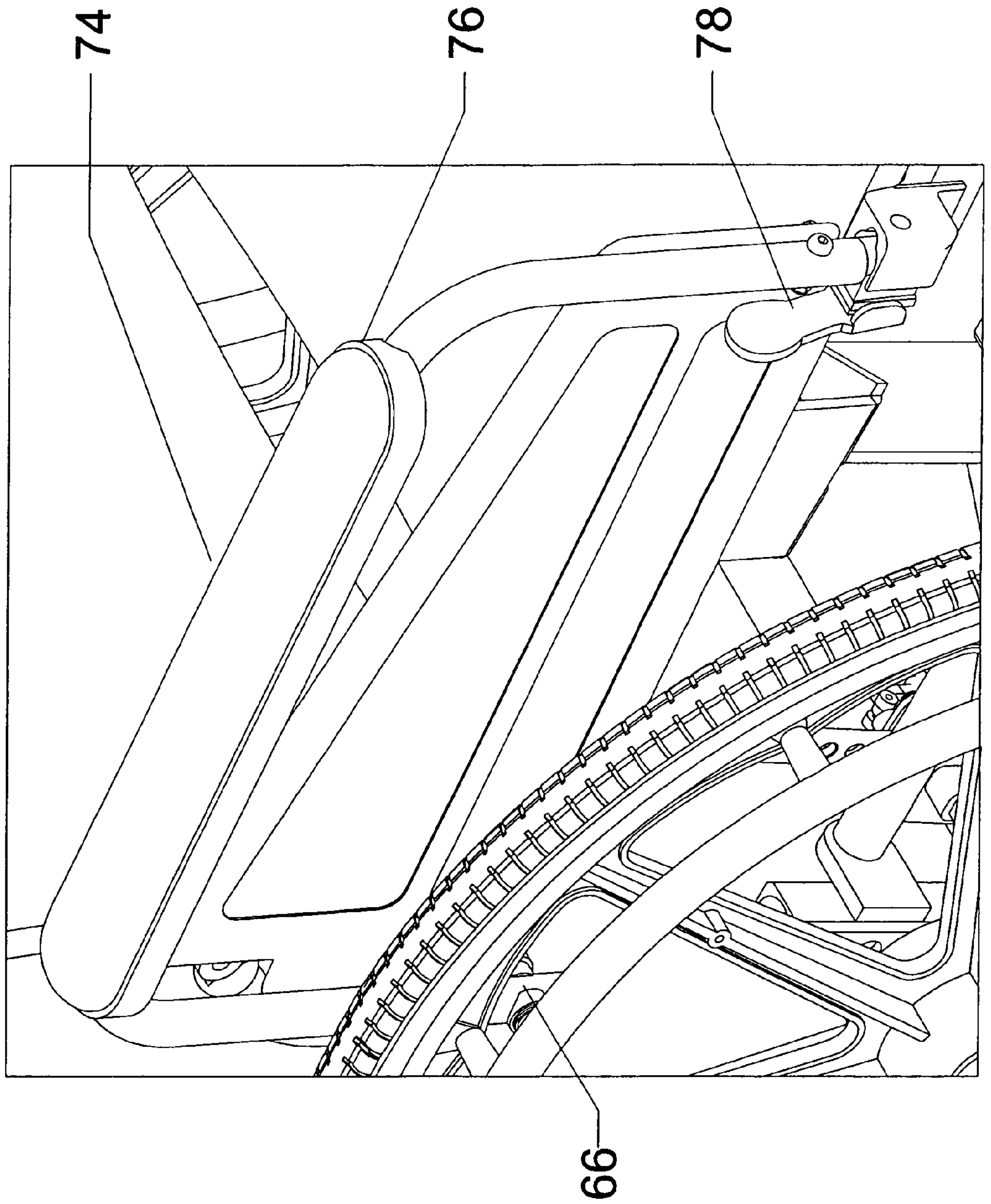
FIG. 10 is an enlarged partial perspective view taken from the opposite side of the embodiment shown in FIG. 2, showing the armrest in detail.
Figure 12:
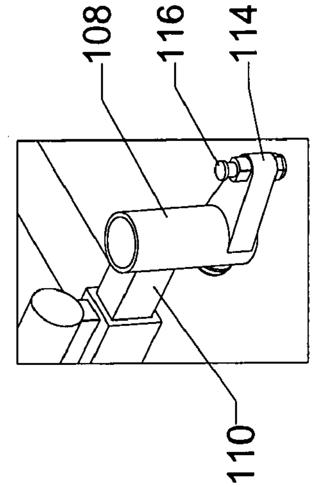
FIG. 12 is a partial perspective view of the embodiment of FIG. 1, showing one of a first pair of footrest receivers.

Preferably, the wheelchair 20 includes a brake assembly 88 on each upper side member 32 of the frame assembly 22, as more clearly shown in FIGS. 2 and 8. Each of the brake assemblies 88 which are preferably made of aluminium, is adjustably attached by a bracket 90 to one of the upper side frame members 32. The bracket 90 is affixed to the upper side frame member 32 and slidably receives the brake assembly 88. Thus, the brake assembly 88 can be moved towards or away from the main wheel 26 and is secured in a selected position with respect to the brackets 90, in order to accommodate different locking positions. The brake assembly 88 includes a threaded brake drum 92 which allows better friction in order to prevent wheel movement when in a locked position. Such brake assemblies 88 have been used in prior art wheelchairs and are well known in the art, and will therefore not be further described.

Figure 13:
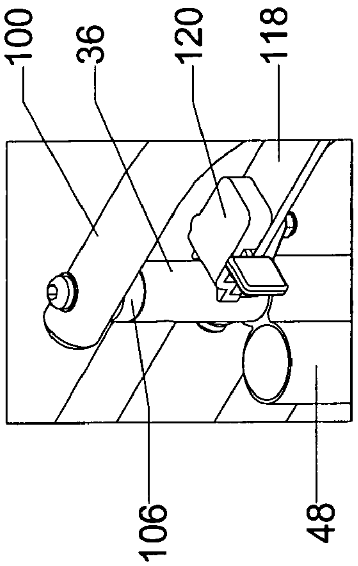
FIG. 13 is a partial perspective view in an enlarged scale of the one of the first pair of the footrest receivers with the footrest being attached.

Referring again to FIGS. 1 and 2, the wheelchair 20 further includes a foot resting device which preferably comprises a pair of footrests 94, selectively attached in an active position in relation to the seat assembly 24 (as shown in FIG. 2), and in an inactive position in relation to the frame assembly 22 (as shown in FIG. 1). Each of the footrests 94 includes a plate 96 attached to a rod 98 extending upwardly. The rod 98 is slidably received within a curved tubular bar 100 which is bent rearwardly about 70°. The height of the footrests 94 can be adjusted by inserting a pin 102 into a selected one of a plurality of holes 104 in the curved tubular bar 100. A solid plastic column 106 (see FIG. 13) is screwed onto the upper end of the curved tubular bar 100 and extends downwardly.

Figure 9:
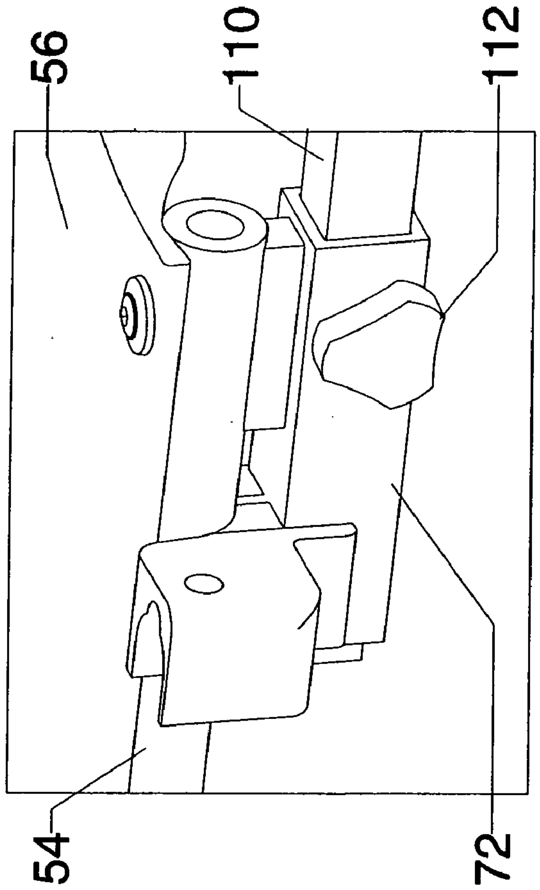
FIG. 9 is an enlarged partial perspective view taken from the opposite side of FIG. 2, showing the seat side member in detail.

As shown in FIGS. 1, 2, 12 and 13, a hollow cylindrical bracket 108 is disposed perpendicularly and is welded to a rectangular cross-sectional bar 110 which in turn is slidably received within the rectangular sleeves 72 on each side of the seat assembly 24. Thus, the hollow cylindrical bracket 108 can be attached to the seat assembly 24 in an adjustable manner and locked into a selected position by a knob 112 (more clearly shown in FIG. 9). The solid plastic column 106 (see FIG. 13) of each footrest 94 is removably and pivotally received in the hollow cylindrical bracket 108 at each side of the seat assembly 24, so that the footrests 94 can be selectively attached to the seat assembly 24 in order to rock back and forth together with the seat assembly 24, with respect to the frame assembly 22. With the footrests 94 attached to the wheelchair 20 in such an active position, the user when seated in the wheelchair 20, is in a position to very easily and forcibly rock the seat assembly 24, which may be required by chair users who have not completely lost leg mobility.

A lock plate 114 with a lock pin 116 (more clearly shown in FIG. 12) extending upwardly therefrom is attached to each of the hollow cylindrical brackets 108 at a lower end thereof. A middle support member 118 attached to a middle portion of the curved tubular bar 100 and extends rearwardly therefrom. A locking device 120 is attached to a rear end of the middle support member 118 (see FIG. 13) such that the locking device 120 releasably engages the lock pin 116 to secure the footrest 94 in position during a rocking motion or during transportation of the wheelchair 20, as shown in FIG. 2, and can be disengaged from the lock pin 116 to allow the footrests 94 to be pivoted outwardly away from the working position in order to permit the wheelchair user to enter or leave the wheelchair 20 through the front end thereof. The sleeves 36 which interconnect the front ends of the respective side frame members 32 and 34 at each side of the wheelchair 20, provide a function similar to that of the hollow cylindrical brackets 108 of the seat assembly 24 by selectively receiving the respective solid plastic columns 106 (see FIG. 13) when the footrests 94 are selected to be attached to the frame assembly 22, as shown in FIG. 1. Thus, the footrests 94 remain stationary with respect to the frame assembly 22 when the seat assembly 24 rocks back and forth. The footrests 94 can be placed in such an inactive position when a fairly moderate rocking motion is required or the wheelchair 20 is being used by users who suffer a complete loss of leg mobility.

The footrests 94, when attached to the frame assembly 22, are also enabled to be locked into their working position as shown in FIG. 1, and to pivot away therefrom. Parts (not shown) similar to the lock plate 114 and lock pin 116, are also attached to the respective sleeves 36 for releasably locking the footrests 94 into the working position when they are attached to the frame assembly 22. The locking device 120 can be any known configuration for releasably engaging a lock pin, which is well known in the art and will not be further described.

A rocking motion controlling system is also provided to the wheelchair 20 in order to provide safety and comfort. The rocking motion controlling system includes a rock/tilt locking mechanism 122 (more clearly shown in FIG. 7) for selectively locking the seat assembly 24 either at the normally unoccupied position as shown in FIG. 1, or in a selected one of a plurality of predetermined tilt positions as shown in FIG. 2. The lock/tilt locking mechanisms include an elongated sliding member 124 pivotally connected at its upper end to one of the side support members 54 of the seat assembly 24. A body member 126 is pivotally connected to one of the lower side members 34 of the frame assembly 22. The body member 126 includes a groove (not indicated) extending along the length of the body member 126 for slidably receiving the sliding member 124 therein. A metal plate 128 is attached to the body member 126 to cover the groove and restrain the sliding member 124 within the groove such that the sliding member is only enabled to move along the length of the body member 126 guided by the groove during a rocking motion of the seat assembly 24. A plurality of openings 130 are defined in the sliding member 124 in a spaced-apart pattern for selectively receiving a locking pin 132. The locking pin 132 is attached to one end of an L-shaped actuating member 134 which is pivotally mounted to the metal plate 128, and is connected at the other end thereof to a controlling cable 136. Thus, the locking pin 132 is normally biased by a spring 133 to move towards the sliding member 124 and extend through an opening (not shown) in the metal plate 128, to then engage a selected one of the openings 130 of the sliding member 124, in order to lock the seat assembly 24 in a selected position. The locking pin 132 can be pulled away by the L-shaped actuating member 134 against the force of spring 133 to disengage the selected opening 130 of the sliding member 124 in order to allow for a sliding motion of the sliding member 124 within the groove of the body member 126 during a rocking motion of the seat assembly 24 when the controlling cable 136 is tensioned.

Figure 6:
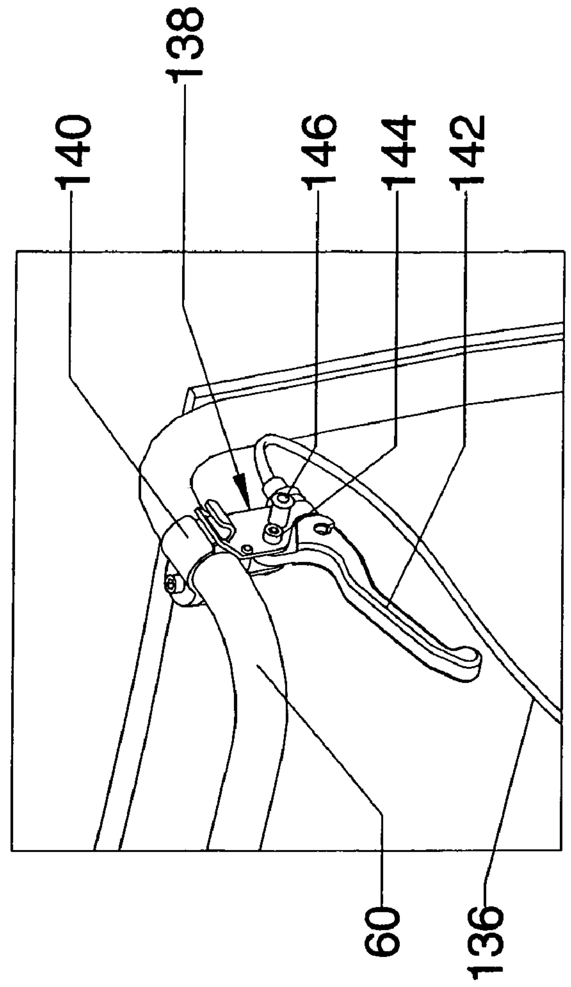
FIG. 6 is a perspective view in an enlarged scale of a controller attached to the seat assembly.
Figure 5:
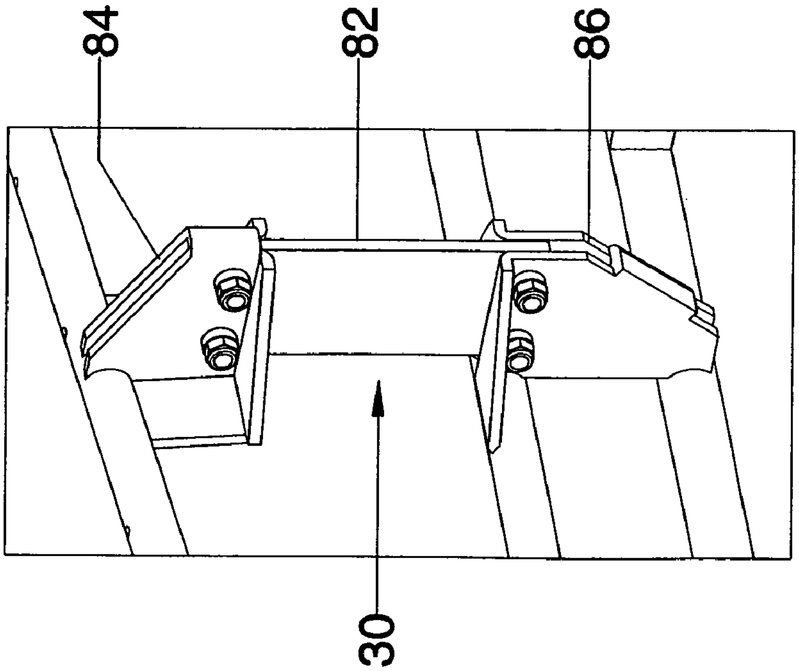
FIG. 5 is a partial perspective view in an enlarged scale of the rocking assembly disposed between the seat assembly and the frame.

In FIGS. 1 and 6, the controlling cable 136 is connected at the other end thereof to a controller assembly 138 which can be conveniently attached at any desired location on the wheelchair 20. In this embodiment, the controller assembly 138 is attached to the grip section 60 of one rear post 58 in order to provide a caregiver-friendly controlling feature. If a user-friendly controlling feature is desired, the controller assembly 136 can be located for example, on the front portion of the armrest 74. The controller assembly 136 includes a bracket 140 securely attached to the grip section 60, and a handle 142 pivotally connected to the bracket 140 and secured with the cable 136, such that when the handle 142 is manually actuated to pivot about a pivot pin 144, the controlling cable 136 is tensioned against the force of spring 133. A locking pin 146 is attached to the bracket 140 and is adapted to be pushed in or pulled out with respect to the bracket 140. When the lock pin 146 is pulled out, the handle 146 is operable, and when the lock pin 146 is pushed in, it engages an opening or recess (not shown) in the handle 146 to lock the handle in an actuated position in which the controlling cable 136 is tensioned, and the locking pin 132 disengages the selected opening 130 of the sliding member 124.

It is preferably to provide a pair of the rock/tilt locking mechanisms 122 together with controller assemblies 138, each being positioned at one side of the wheelchair 20. With such rock/tilt locking mechanisms 122 and the controller assemblies 138, the seat assembly 24 can be conveniently locked in the normally unoccupied position as shown in FIG. 1 to allow the chair user to easily and safely enter or leave the wheelchair 20, or can be locked in any desired tilt position as shown in FIG. 2, when the user is seated in the wheelchair 20. The rock/tilt locking mechanisms 122 are preferably located at the rear of the wheelchair 20 under the seat assembly 24 in a position which avoids accidental contact by the user, while either being conveniently controllable by the caregiver or by the chair user, depending on the positioning of the controller assembly 138 attached to the wheelchair 20.

Referring again to FIGS. 1 and 7, more safety features are provided. The support posts 38 have a predetermined height and each is attached at the top with a plastic protection cap 148 so that the rear and bottom portion of the seat assembly 24 will come into contact with the plastic protection cap 148 when the amplitude of the rocking motion of the seat assembly 24 reaches a predetermined maximum level. This provides a permanent rocking setting to ensure that the rocking motion will be limited to a maximum safety range which can be determined during the designing and manufacturing stage. However, different chair users may wish to select different maximum rocking motion amplitudes and will feel unsafe or uncomfortable if the rocking motion exceeds a personal comfort level. In order to allow user selection of the maximum rocking amplitude, the wheelchair 20 is provided with an adjustable rocking motion setting device for adjustably setting a selected maximum rocking motion amplitude according to a user's preference, which is however, within the maximum safety range.

The adjustable rocking motion setting device is preferably incorporated with the rock/tilt assembly 122, and in this embodiment includes a pair of stop members 150 positioned above the body member 126 and secured together by two screws 152 to sandwich the sliding member 124 therebetween. When the screws 152 are loosened, the stop members 150 are enabled to slide along the sliding member 124 and the stop members 150 can then be secured by tightening the screws 152 in a selected position on the sliding member 124. Thus, the sliding motion of the sliding member 124 relative to the body member 126 is limited by the selected position of the stop members 150 on the sliding member 124. By adjusting the position of the stop members 150 on the sliding member 124, the maximum rocking motion amplitude of the seat assembly 24 can be selected according to the user's preference, but only within the maximum safety level determined by the height of the rear posts 38. When two adjustable rocking motion setting devices are provided with rock/tilt locking mechanisms 122 at the respective sides of the wheelchair 20, adjustment of the stop members 150 at the respective sides of the wheelchair 20 should be coordinated.

Figure 11:
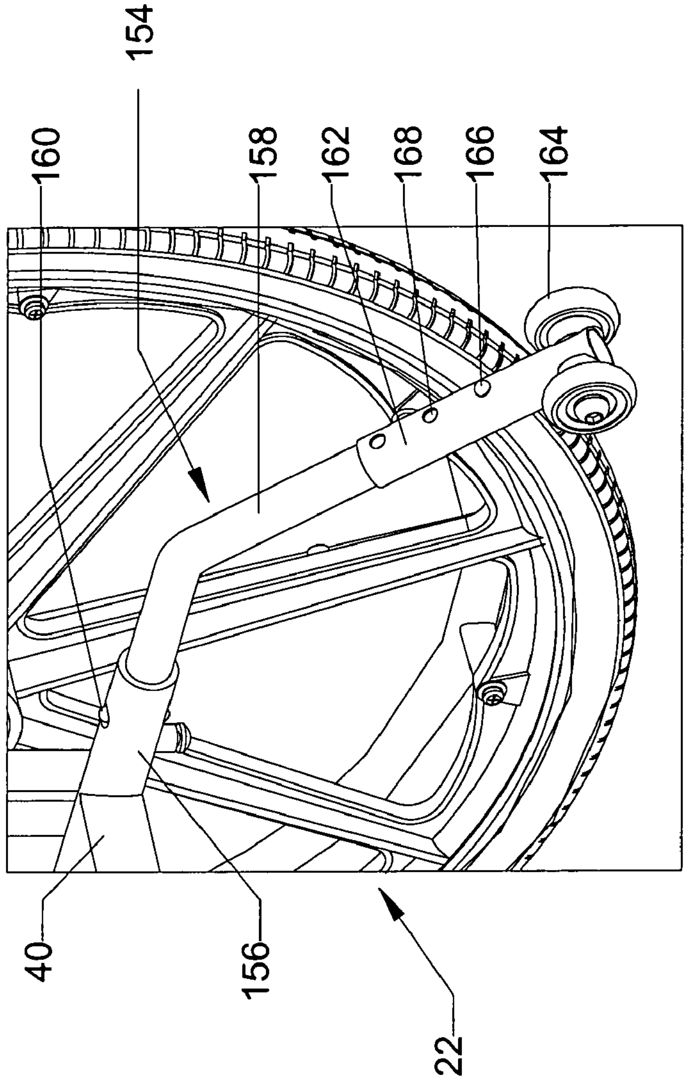
FIG. 11 is a partial rear perspective view in an enlarged scale of the embodiment of FIG. 1, showing the adjustable anti-tip device.

Referring to FIGS. 1, 2 and 11, a further safety feature is provided to the wheelchair 20. An anti-tip device 154 is attached to the frame assembly 22. The anti-tip device 154 includes a sleeve member 156 securely welded to the rear cross brace 40 and a tubular member 158 which is telescopically connected at one end thereof to the sleeve member 156 and is bent downwardly. A plurality of holes (not shown) are provided in the tubular member 158 at each end thereof. The upper end of the tubular member 158 which is telescopically connected to the sleeve member 156, can be locked together with the sleeve member 156 by a pin 160 which extends through a hole (not shown) in the sleeve member 156, and then through a selected hole of the tubular member 158. Therefore, the locked position of the tubular member 158 with respect to the sleeve member 156 is adjustable. The lower end of the tubular member 158 is received within an end sleeve 162 which is equipped at its outer end with a roller assembly 164. The end sleeve 162 also includes a plurality of holes 166. A locking pin 168 extends through a selected one of the holes 166 of the end sleeve 162 and through a selected hole in the lower end of the tubular member 158 such that the vertical position of the roller assembly 164 with respect to the frame assembly 22 can be adjusted, in order to ensure contact between the roller assembly 164 and the ground surface. With the support of the anti-tip device 154 contacting the ground, the wheelchair 20 during a rocking motion, is prevented from falling backwards. During transportation of the wheelchair 20, the anti-tip device 154 can optionally be left in contact with the ground surface because the roller assembly 164 can roll along a smooth surface. Optionally, the anti-tip device 154 can be turned to a position as shown in FIG. 1, in which the tubular member 158 is turned 180 degrees and extends upwardly away from the ground surface. With the anti-tip device placed in such a position, the wheelchair 20 is much more easily moved along the ground, particularly when the ground surface is not very smooth. In order to provide a caregiver-friendly feature, it is preferable that two anti-tip devices 154 are provided, being disposed at opposed sides of the frame assembly 22.

In operation, the wheelchair 20 can be first adjusted in height by determining the installation of the main wheels 26 and the castor wheels 28, according to the user's size. It must then be determined whether the footrests 94 should be attached to the active position as shown in FIG. 2, or in the inactive position as shown in FIG. 1, in accordance to the user's health condition and preference. Once the appropriate footrest position is determined, then the footrest's height should be adjusted accordingly. If the footrests 94 are attached in the active position as shown in FIG. 2, the cylindrical brackets 108 should also be adjusted accordingly by moving the rectangular cross-sectional bars 110 within the respective rectangular sleeves 72. The anti-tip device 154 is then adjusted appropriately and is preferably positioned as shown in FIGS. 2 and 11, for supporting the wheelchair 20. The lock/tilt locking assembly 122 is selected to be locked in a position so that the seat assembly 24 presents a normal unoccupied position as shown in FIG. 1, for receiving the user to be seated therein. The armrest 74 at one side of the wheelchair 20 is pivoted upwardly, if required, allowing the user convenient access to the wheelchair 20. The footrests 94 are optionally pivoted away from the front position according to user preference. The brake assembly 88 is adjusted to brake the main wheels 26. After the user is seated in the seat assembly 24, the armrest 74 and the footrests 94 are returned to their normal working positions. With the assistance of a caregiver, the stop members 150 on the sliding member 124 are set to a position which allows only a rocking motion of the seat assembly 24 which is comfortable to the user seated therein. The wheelchair 20 is now ready to be used to transport and/or rock the user seated therein.

Controlled by the caregiver, the wheelchair 20 can be selectively placed in a condition for comfortable rocking motion, or can be locked in any tilt or substantially upright position in which the seat member 56 is substantially horizontal, for various purposes. The anti-tip device 154 is selectively positioned either in the position of FIG. 1 or the position of FIG. 2, depending on the operation of the wheelchair 20. The brake assembly 88 is also braked or released accordingly.

The rocking wheelchair 20 according to the present invention, advantageously provides various adjustable features to meet with a variety of wheelchair users' needs and requirements. The rocking wheelchair 20 of the present invention is also constructed in a simple configuration and is easily manufactured. Multiple safety features make this wheelchair 20 more attractive to users by addressing safety, adjustability and user/caregiver convenience.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

We claim:

1. A wheelchair that permits a user to rock while seated therein, the wheelchair comprising:

a frame structure;

a plurality of wheels rotatably mounted to the frame structure;

a seat assembly having a seat member and a back support member;

a rocking assembly disposed between the seat assembly and the frame structure, including bias means a spring device for normally maintaining the seat member in a desired alignment when the wheelchair is unoccupied, and permitting resulting in a rocking motion of the seat assembly to yieldably rock back and forth about a substantially horizontal axis with respect to the frame structure when the center of gravity of the user is shifted in a rhythmic manner; and a rocking motion controlling system including a first rocking motion setting device for adjustably setting a selected maximum rocking motion according to a user's preference, and rock/tilt locking mechanisms for selectively locking the seat assembly in the normally unoccupied position or in a selected one of a plurality of predetermined tilt positions, the rock/tilt mechanisms being located in a position not accessible by the user when seated in the wheelchair and being controlled by a controller attached to the wheelchair in a preferred location; and wherein the rock/tilt locking mechanisms comprise:

an elongated sliding member including a plurality of openings therethrough in a spaced-apart relationship, the sliding member being pivotally connected at an upper end to the seat assembly, a body member pivotally connected to the frame structure for guiding the sliding member in a sliding motion relative thereto during rocking motion of the seat assembly, and a pin operatively attached to the body member and operable between a first position in which the pin is inserted into a selected one of the openings in the sliding member to lock the seat assembly, and a second position in which the pin is positioned away from the sliding member to permit rocking motion of the seat assembly.

2. A wheelchair as claimed in claim 1 wherein the rocking motion controlling system comprises a second rocking motion setting device for ensuring that the selected maximum rocking motion is not greater than a predetermined level.

3. A wheelchairas claimed in claim 1 wherein the firstrocking motion setting device is incorporated with the rock/tilt locking mechanisms.

4. A wheelchair as claimed in claim 1 wherein the first rocking motion setting device comprises a stop member adjustably secured to the sliding member to restrict the sliding motion thereof within a selected range.

5. A wheelchair as claimed in claim 1 wherein the rock/tilt locking mechanisms comprise a cable operatively connected at one end thereof to the pin, and operatively connected at the other end to the controller, for controlling the pin between the first and second positions thereof.

6. A wheelchair as claimed in claim 5 wherein the controller comprises:

a bracket attached to the seat assembly behind the back support member;

a handle pivotally connected to the bracket and secured with the cable, such that a pivoting motion of the handle tensions the cable to move the pin from the first position to the second position; and a lock member selectively locking the handle in position when the cable is tensioned.

7. A wheelchair as claimed in claim 6 wherein the pin of the rock/tilt locking mechanisms is normally biased to the first position thereof and the lock member is normally biased in an unlocked position in which the handle is able to pivot.

8. A wheelchair as claimed in claim 1 wherein the spring device of the rocking assembly comprises a pair of leaf springs in a spaced-apart relationship and defining a substantially vertical plane transverse to the seat assembly, the leaf springs interconnecting the seat assembly and the frame structure.

9. A wheelchair as claimed in claim 1 further comprising a pair of brakes mounted to the frame structure and adapted to-brake at least two of the wheels.

10. A wheelchair as claimed in claim 1 further comprising a pair of footrests removably mounted on the frame structure.

11. A wheelchair as claimed in claim 1 further comprising a pair of footrests removably mounted to the seat assembly.

12. A wheelchair as claimed in claim 1 wherein the frame structure comprises an anti-tip device for preventing the wheelchair from falling backwards during the rocking motion.

13. A wheelchair as claimed in claim 12 wherein the anti-tip device is adjustable to ensure an operative position in which the anti-tip device makes contact with a ground surface.

14. A wheelchair as claimed in claim 12 wherein the anti-tip device is adapted to be disabled when the wheelchair is not in a rocking motion.

15. A wheelchair that permits a user to rock while seated therein, the wheelchair comprising:

a frame structure;

a plurality of wheels rotatably mounted to the frame structure;

a seat assembly having a seat member and a back support member;

a rocking assembly disposed between the seat assembly and the frame structure, including a bias means for normally maintaining the seat member in a desired alignment when the wheelchair is unoccupied, and permiting the seat assembly to yieldably rock back and forth about a substantially horizontal axis with respect to the frame structure; and a rocking motion controlling system including rock/tilt locking mechanisms for selectively locking the seat assembly in the normally unoccupied position or in a selected one of a plurality of predetermined tilt positions, the rock/tilt locking mechanisms including a pair of locking elements operatively mounted to the respective seat assembly and the frame structure, one of the locking elements being receivable in a selected one of a plurality of spaces defined in the other of the locking elements.

16. A wheelchair as claimed in claim 15 wherein the rock/tilt locking mechanisms comprise a spring which biases the locking elements into engagement, the locking elements being disengagable by actuating a contoller against the spring force.

17. A wheelchair as claimed in claim 16 comprising a pair of footrests selectively mounted to the wheelchair in a first position in which the footrests are adapted to rock together with the seat assembly, and a second position in which the footrests are stationary with respect to the seat assembly during the rocking motion.

18. A wheelchair as claimed in claim 17 wherein each of the footrests is adjustable in the respective first and second attached position.

19. A wheelchair as claimed in claim 16 wherein the controller is attached to the wheelchair in a selected position for controlling the rock/tilt locking mechanisms.

20. A wheelchair as claimed in claim 15 wherein the rocking motion controlling system comprises a first rocking motion setting device for adjustably setting a selected maximum rocking motion according to a user's preference.

21. A wheelchair as claimed in claim 20 wherein the rocking motion controlling system comprises a second rocking motion setting device for ensuring that the selected maximum rocking motion is not greater than a predetermined level.

22. A wheelchair as claimed in claim 20 wherein the first rocking motion setting device is incorporated with the rock/tilt locking mechanisms.

23. A wheelchair as claimed in claim 15 wherein the frame structure comprises ananti-tip device for preventing the wheelchair from falling backwards during a rocking motion.

* * * * *